(12) United States Patent
Brugger et al.

(10) Patent No.: US 9,798,313 B2
(45) Date of Patent: Oct. 24, 2017

(54) METHOD FOR CONTROLLING A DEVICE SYSTEM HAVING POWER TOOL AND A MOTOR-DRIVEN ADVANCING MECHANISM

(71) Applicant: Hilti Aktiengesellschaft, Schaan (LI)

(72) Inventors: Peter Brugger, Feldkirch (AT); Georg Studer, Thueringen (AT)

(73) Assignee: Hilti Aktiengesellschaft, Schaan (LI)

( * ) Notice: Subject to any disclaimer, the term of this patent is extended or adjusted under 35 U.S.C. 154(b) by 247 days.

(21) Appl. No.: 14/767,505

(22) PCT Filed: Feb. 11, 2014

(86) PCT No.: PCT/EP2014/052583
§ 371 (c)(1),
(2) Date: Aug. 12, 2015

(87) PCT Pub. No.: WO2014/124912
PCT Pub. Date: Aug. 21, 2014

(65) Prior Publication Data
US 2015/0370241 A1 Dec. 24, 2015

(30) Foreign Application Priority Data
Feb. 14, 2013 (DE) .......... 10 2013 202 442

(51) Int. Cl.
*B23D 59/00* (2006.01)
*G05B 19/402* (2006.01)
(Continued)

(52) U.S. Cl.
CPC ......... *G05B 19/402* (2013.01); *B23D 59/002* (2013.01); *B28D 1/045* (2013.01); *B28D 7/005* (2013.01); *G05B 2219/45144* (2013.01)

(58) Field of Classification Search
CPC ........ G05B 19/402; G05B 2219/45144; B23D 59/002; B28D 1/045; B28D 7/005
See application file for complete search history.

(56) References Cited

U.S. PATENT DOCUMENTS 3,571,796 A * 3/1971 Brugger ............... G06K 9/4647
250/227.28
3,919,900 A 11/1975 Allen et al.
(Continued)

FOREIGN PATENT DOCUMENTS

DE 921206 12/1954
DE 10253350 5/2004
(Continued)

*Primary Examiner* — Sean Michalski
(74) *Attorney, Agent, or Firm* — Davidson, Davidson & Kappel, LLC

(57) ABSTRACT

A method for controlling a device system (10) having a saw blade (14) that is attached to a saw arm (15) and that can be moved along an advancing direction (26) by a motor-driven advancing mechanism (13), whereby there is an infeed motion of the saw arm (15) with the saw blade (14) into the workpiece (18) and, during the infeed motion of the saw arm (15) into the workpiece (18), a control unit (27) calculates an arc length ($\phi$) of the saw blade (14) that is engaged with the workpiece (18), and the calculated arc length ($\phi$) is compared to a pre-set, critical arc length ($\phi_{crit}$) of the saw blade (14).

8 Claims, 4 Drawing Sheets

(51) Int. Cl.
*B28D 1/04* (2006.01)
*B28D 7/00* (2006.01)

(56) References Cited

U.S. PATENT DOCUMENTS

| | | | | |
|---|---|---|---|---|
| 5,208,763 | A * | 5/1993 | Hong | G05B 19/402 |
| | | | | 700/192 |
| 5,237,897 | A * | 8/1993 | Wijesinghe | B23D 55/10 |
| | | | | 83/72 |
| 5,287,843 | A * | 2/1994 | Katayama | B23D 47/005 |
| | | | | 125/13.02 |
| 5,383,444 | A * | 1/1995 | Kimura | B23D 59/002 |
| | | | | 125/13.02 |
| 5,456,147 | A * | 10/1995 | Stange, Jr. | B23D 59/001 |
| | | | | 125/13.01 |
| 5,689,072 | A * | 11/1997 | Chiuminatta | B23D 59/001 |
| | | | | 29/404 |
| 5,694,821 | A * | 12/1997 | Smith | B23D 59/002 |
| | | | | 700/188 |
| 5,906,460 | A * | 5/1999 | Link | B23Q 17/09 |
| | | | | 356/602 |
| 6,128,989 | A * | 10/2000 | Jones | B23D 47/005 |
| | | | | 144/247 |
| 6,320,344 | B1 * | 11/2001 | Sakamoto | G05B 19/19 |
| | | | | 318/567 |
| 7,013,574 | B2 * | 3/2006 | Plunkett | G01B 5/061 |
| | | | | 33/640 |
| 7,434,889 | B2 * | 10/2008 | Moller | B23D 59/001 |
| | | | | 299/1.5 |
| 9,144,929 | B2 * | 9/2015 | Tan | B29C 45/281 |
| 2005/0057206 | A1 | 3/2005 | Uneyama et al. | |
| 2006/0189258 | A1 | 8/2006 | Schaer et al. | |
| 2014/0277720 | A1 * | 9/2014 | Izumi | B25J 9/1687 |
| | | | | 700/253 |
| 2014/0297021 | A1 * | 10/2014 | Aggarwal | G05B 19/40937 |
| | | | | 700/160 |
| 2016/0291571 | A1 * | 10/2016 | Cristiano | G05B 19/402 |
| 2017/0131701 | A1 * | 5/2017 | Nelson | G05B 19/402 |
| 2017/0131702 | A1 * | 5/2017 | Itou | G05B 19/402 |

FOREIGN PATENT DOCUMENTS

| | | |
|---|---|---|
| EP | 1178869 | 2/2002 |
| EP | 1693173 | 8/2006 |
| SU | 641863 | 1/1979 |
| SU | 1115870 | 9/1984 |
| WO | WO00/71294 | 11/2000 |

* cited by examiner

METHOD FOR CONTROLLING A DEVICE SYSTEM HAVING POWER TOOL AND A MOTOR-DRIVEN ADVANCING MECHANISM

The present invention relates to method for controlling a device system having a power tool and a motor-driven advancing mechanism.

BACKGROUND

European patent application EP 1 693 173 A1 discloses a method for controlling a device system during the cutting of a workpiece along a cutting line. The device system consists of a guide rail, a saw head that is arranged so as to be movable on the guide rail and a motor-driven advancing mechanism to move the saw head along the guide rail. The saw head comprises a saw blade that is attached to a saw arm and that is driven around a rotational axis. The saw arm is configured so that it can be swiveled around a swivel axis. The cutting depth of the saw blade in the workpiece is varied by a swiveling movement of the saw arm around the swivel axis. The saw blade is rotated around the rotational axis by a drive motor, while the saw arm is swiveled by a swivel motor. The drive motor and the swivel motor are arranged in a device housing of the saw head. The motor-driven advancing mechanism comprises a guide carriage and an advancing motor that is arranged in the device housing. The saw head is installed on the guide carriage and configured so as to be movable by the advancing motor along the guide rail in an advancing direction. Aside from the motors, there is also a control unit that is installed in the device housing and that serves to control the wall saw and the motor-driven advancing mechanism.

This prior-art method for controlling a device system during the cutting of a workpiece along a cutting line entails a sequence of three method steps that are carried out one after the other. In the first method step, the saw arm is slanted at a swivel angle that corresponds to the depth of the partial cut. In the second method step, the saw head is moved forward along the guide rail along the advancing direction until it reaches a first end point of the cutting line. In the third method step, the saw head is moved backwards along the guide rail along the advancing direction until it reaches a second end point of the cutting line. The cut is made in several partial cuts These three method steps are continuously repeated until the desired cutting depth has been reached.

In the prior-art method for controlling a device system, there is no controlled plunging of the saw blade into the workpiece that is to be processed. In the first step of the prior-art method, the saw arm is slanted at a swiveling angle that corresponds to the depth of the first partial cut. A drawback of this is that the cutting segments might become polished when the saw blade plunges in. Polishing of the cutting segments shortens the service life of the cutting segments and reduces the working speed of the saw blade.

SUMMARY OF THE INVENTION

It is an object of the present invention to provide a method for controlling a device system having a saw blade that is attached to a saw arm, whereby the plunging of the saw blade into a workpiece that is to be processed is optimized in terms of the service life and the working speed of the saw blade.

The present invention provides that during the infeed motion of the saw arm into the workpiece, a control unit calculates an arc length of the saw blade that is engaged with the workpiece, and the calculated arc length is compared to a pre-set, critical arc length of the saw blade. Thanks to the calculation of the arc length of the saw blade that is engaged with the workpiece, the method according to the invention can be regulated with an eye towards attaining a high working speed of the saw blade as well as a long service life of the cutting segments. The saw blade plunges automatically after the start, without intervention by the operator. The method can be initiated from various positions, for instance, from a position in which the saw blade is situated above the workpiece, or else from a position in which the saw blade already has made a pre-cut in the workpiece.

Saw blades for wall saws are made up of two parts, namely, a base body and cutting segments along the circumference of the base body. The cutting segments are made of a matrix material in which diamond particles are embedded. A minimum surface pressure is required in order to expose the diamond particles during the processing. If the value falls below the minimum surface pressure, the diamond particles are not exposed during the processing with the saw blade and the risk exists that the cutting segments will become polished, which reduces the service life as well as the working speed of the saw blade. The minimum surface pressure of the cutting segments corresponds to a critical arc length of the saw blade and should not be exceeded. The value of the critical arc length of a saw blade is dependent on a number of parameters, among others, the specification of the saw blade, the material of the workpiece that is to be processed as well as the output and the torque of the drive motor of the saw blade.

In a refinement of the method, the infeed motion of the saw arm is interrupted and the saw blade undergoes an advancing movement in the forward direction along the advancing direction when the calculated arc length matches the critical arc length of the saw blade. Owing to the advancing movement of the saw blade in the forward direction, the arc length of the saw blade that is engaged with the workpiece decreases and falls below the critical arc length. The monitoring of the arc length during the infeed motion of the saw arm as well as the advancing movement of the saw blade ensure that the critical arc length of the saw blade is not exceeded and that the cutting segments will have a long service life.

Especially preferably, the control unit calculates the movement of the saw blade in the forward direction during the advancing movement of the saw blade, and the calculated movement of the saw blade is compared to a pre-set, first movement. As a result of the advancing movement in the workpiece, the saw blade eases off. The position of the saw blade is monitored, for example, by a position sensor, and then transmitted to the control unit. The control unit calculates the movement in the forward direction on the basis of the positions of the saw blade.

In a refinement of the method, the advancing movement of the saw blade is interrupted and there is an additional infeed motion of the saw arm into the workpiece when the calculated movement of the saw blade matches a pre-set, first movement. When the saw blade eases off due to the advancing movement in the forward direction, the arc length of the saw blade falls below the critical arc length and the infeed motion of the saw arm can be continued.

Especially preferably, during the further infeed motion of the saw arm, the control unit calculates the arc length of the saw blade that is engaged with the workpiece, and the calculated arc length of the saw blade is compared to the critical arc length. Monitoring the arc length during the infeed motion of the saw arm ensures that the crucial arc length of the saw blade is not exceeded and that the cutting segments will have a longer service life.

In a refinement of the method, the additional infeed motion of the saw arm is interrupted and there is an advancing movement of the saw blade along the advancing movement in a backward direction opposite from the forward direction when the calculated arc length matches the critical arc length of the saw blade. Owing to the advancing movement of the saw blade in the backward direction, the arc length of the saw blade that is engaged with the workpiece decreases and falls below the critical arc length.

Especially preferably, during the advancing movement of the saw blade, the control unit calculates the movement of the saw blade in the backward direction, and the calculated movement is compared to a pre-set, second movement. In this process, the advancing movement of the saw blade is preferably interrupted when the calculated movement of the saw blade matches the second movement. When the saw blade eases off the workpiece due to the movement in the backward direction, the arc length of the saw blade falls below the critical arc length and the infeed motion of the saw arm can be continued.

The infeed motion of the saw arm and the advancing movement of the saw head along the advancing direction are alternately carried out until the plunging of the saw blade is ended and the saw blade has reached the desired cut depth in the workpiece.

Embodiments of the invention will be described below with reference to the drawing. The drawing does not necessarily depict the embodiments true-to-scale, but rather, the drawing—where necessary for the sake of explanation—is shown in schematic and/or slightly distorted form. Regarding any additions to the teaching that can be gleaned directly from the drawing, reference is hereby made to the pertinent state of the art. Here, it should be kept in mind that many modifications and changes relating to the shape and to details of an embodiment can be made without departing from the general idea of the invention. The features of the invention disclosed in the description, in the drawing as well as in the claims can be essential for the refinement of the invention, either individually or in any desired combination. Moreover, all combinations of at least two of the features disclosed in the description, in the drawing and/or in the claims fall within the scope of the invention. The general idea of the invention is not limited to the exact form or detail of the preferred embodiment shown and described below nor is it limited to a subject matter that would be limited in comparison to the subject matter put forward in the claims. At given rated ranges, values that fall within the specified limits are also disclosed as limit values and can be used and claimed as desired. For the sake of clarity, identical or similar parts or else parts with an identical or similar function are designated by the same reference numerals below.

BRIEF DESCRIPTION OF THE DRAWINGS

The following is shown.

DETAILED DESCRIPTION

Figure 1:
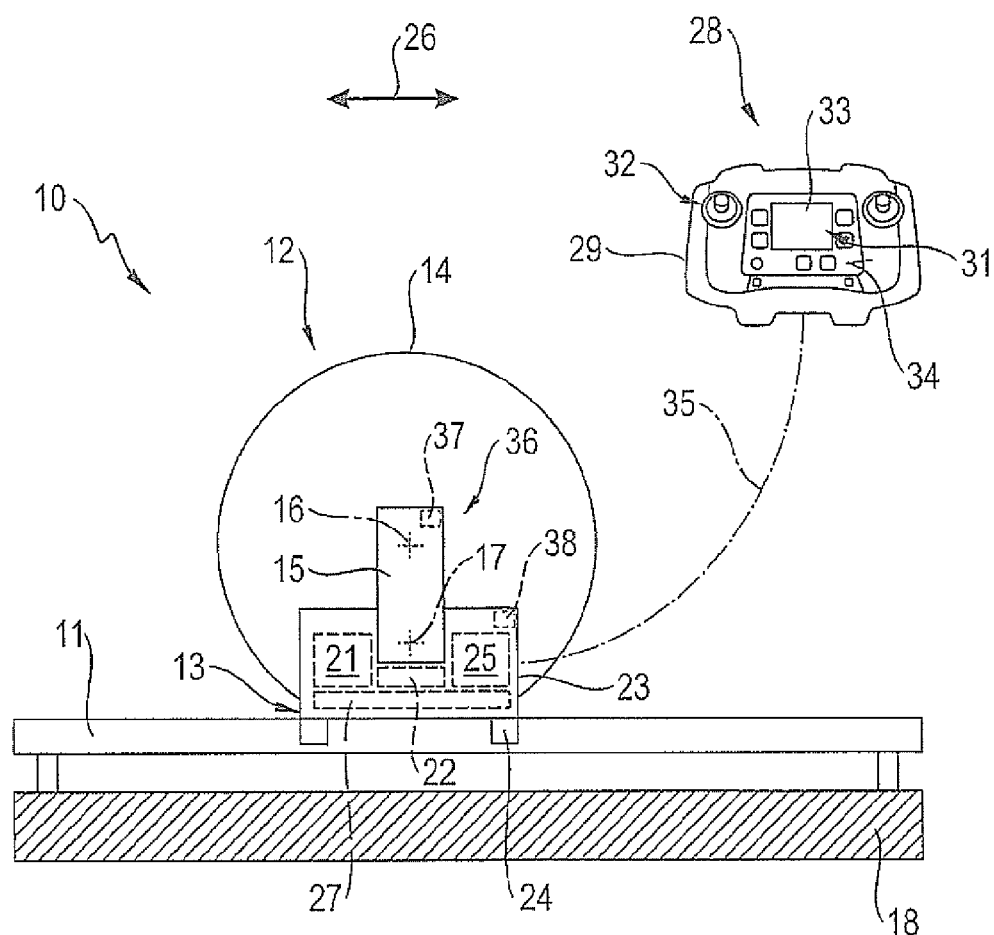
FIG. 1: a rail-guided device system consisting of a guide rail, a saw head that is arranged so as to be movable on the guide rail, and a motor-driven advancing mechanism to move the saw head along the guide rail.

FIG. 1 is a schematic view of a rail-guided device system 10, consisting of a guide rail 11, a power tool 12 that is arranged so as to be movable on the guide rail 11, and a motor-driven advancing mechanism 13 to move the power tool 12 along the guide rail 11.

The power tool is configured as a saw head 12 and it comprises a saw blade 14 that is attached to a saw arm 15 and that is driven around a rotational axis 16. The saw arm 15 is configured so that it can be swiveled around the swivel axis 17. The cutting depth of the saw blade 14 is varied by a swiveling movement of the saw arm 15 around the swivel axis 17. The swivel angle of the saw arm 15, together with the diameter of the saw blade 14, determines how deep the saw blade 14 plunges into the workpiece 18 that is to be processed. As an alternative to the swiveling movement of the saw arm 15 around the swivel axis 17, the saw arm 15 can be adjusted, for instance, by means of a linear drive or another such drive unit. The plunging of the saw blade 14 into the workpiece 18 is referred to as the infeed motion of the saw arm 15, irrespective of the structural design of the drive unit. In order to protect the operator, the saw blade 14 can be surrounded by a blade guard that is attached to the saw arm 15 by means of a blade guard holder.

The saw blade 14 is rotated around the rotational axis 16 by a drive motor 21, while the saw arm 15 is swiveled around the swivel axis 17 by a swivel motor 22. The drive motor 21 and the swivel motor 22 are arranged in a device housing 23 of the saw head 12. The motor-driven advancing mechanism 13 comprises a guide carriage 24 and an advancing motor 25 that is arranged in the device housing 23. The saw head 12 is installed on the guide carriage 24 and configured so as to be movable by the advancing motor 25 along the guide rail 11 in an advancing direction 26. The device housing 23 accommodates not only the motors 21, 22, 25, but also a first control unit 27 to control the saw head 12 and the motor-driven advancing mechanism 13. A method according to the invention for controlling the device system 10 when the saw blade 14 plunges into the workpiece 18 that is to be processed is stored in the first control unit 27.

The saw blades 14 used for the saw head 12 are made up of two parts, namely, a base body and several cutting segments, whereby the cutting segments are arranged along the circumference of the base body. The cutting segments are made of a matrix material in which diamond particles are embedded. A minimum surface pressure is required in order to expose the diamond particles during the processing. If the value falls below the minimum surface pressure, the diamond particles are not exposed during the processing with the saw blade 14 and the risk exists that the cutting segments will become polished, which reduces the working speed of the saw blade 14 as well as the service life. The minimum surface pressure of the cutting segments corresponds to a critical arc length $\phi_{crit}$ of the saw blade 14. For this reason, the arc length of the saw blade 14 that is engaged with the workpiece 18 should not exceed the critical arc length $\phi_{crit}$. The value of the critical arc length $\phi_{crit}$ of a saw blade 14 depends on several parameters, among others, the specification of the saw blade 14, the material of the workpiece 18 as well as the output and the torque of the drive motor 21.

The device system 10 is operated by means of a control unit 28 which, in the embodiment shown in FIG. 1, is configured as a remote control unit. The remote control unit 28 comprises a device housing 29, a second control unit 31 accommodated in the device housing 29 as well as an operating means 32 and a display means 33 that are arranged on the top 34 of the device housing 29. The second control unit 31 is connected to the first control unit 27 via a communication connection 35. The communication connection 35 is configured as a hard-wired connection or else as a wireless communication connection, for example, in the form of an infrared, Bluetooth, WLAN or Wi-Fi connection. Aside from the listed wireless connection technologies, all familiar and future wireless connection technologies for data transmission are suitable.

The device system 10 has a sensor system 36 with several sensor elements in order to monitor the device system 10 and the work process. A first sensor element 37 is configured as a swivel-angle sensor, while a second sensor element 38 is configured as a position sensor. The swivel-angle sensor 37 measures the momentary swivel angle of the saw arm 15. The swivel angle of the saw arm 15, together with the diameter of the saw blade 14, determines how deep the saw blade 14 plunges into the workpiece 18. The position sensor 38 measures the momentary position of the saw head 12 on the guide rail 11. The measured quantities are transmitted to the first control unit 27 by the swivel-angle sensor 37 and by the position sensor 38.

FIGS. 2A-E show the saw head 12 and the saw arm 15 with the mounted saw blade 14 of the device system 10, in five different positions when the saw blade 14 plunges into a workpiece 18 that is to be processed. The plunging takes place automatically by means of the method according to the invention for controlling a device system when the saw blade plunges into the workpiece.

Figure 2A:
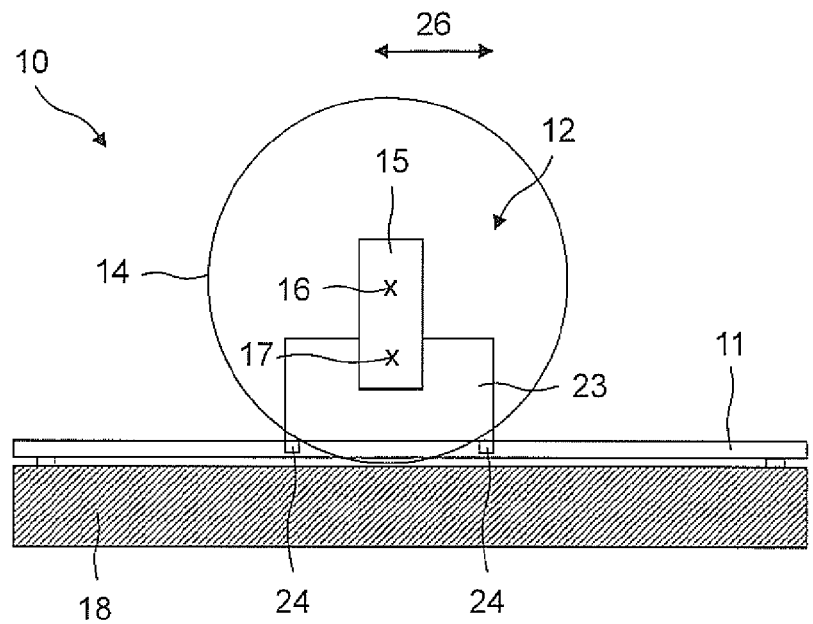
FIGS. 2A-E: the saw head of FIG. 1, with a saw blade that is attached to a swiveling arm, in five different positions during the plunging of the saw blade into a workpiece that is to be processed.
Figure 2B:
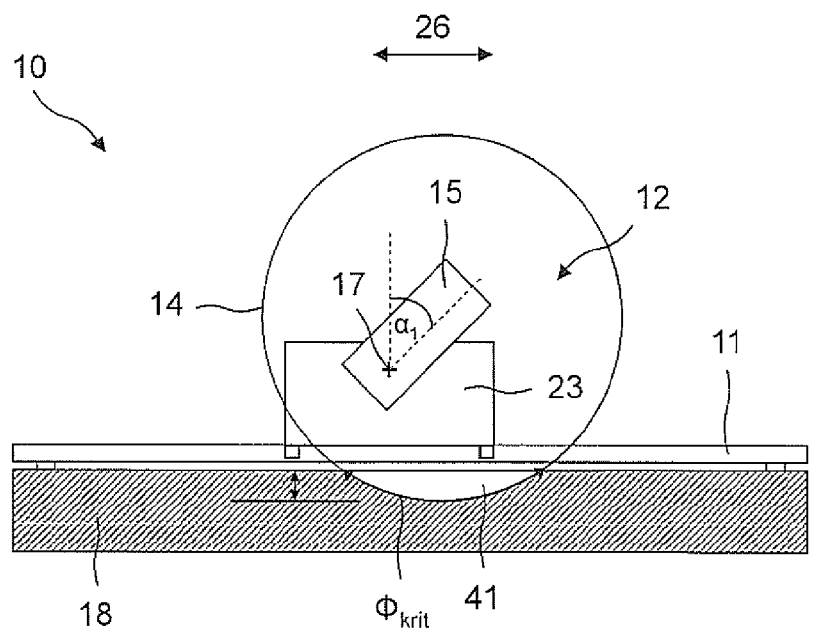

FIG. 2A shows the saw head 12 and the saw arm 15 with the mounted saw blade 14 in a basic position. In the basic position, the saw blade 14 is located above the workpiece 18. From the basic position, the saw blade 14 is moved into the workpiece 18 by a swiveling movement of the saw arm 15 around the swivel axis 17. During the swiveling movement of the saw arm 15, the saw blade 14 is driven around the rotational axis 16 by the drive motor 21. The saw blade 14 creates a first cut wedge 41 in the workpiece 18 (FIG. 2B). During the swiveling movement of the saw arm 15, the first control unit 27 calculates an arc length $\phi$ of the saw blade 14 that is engaged with the workpiece 18 and compares it to the critical arc length $\phi_{crit}$. The arc length of the saw blade 14 that is engaged with the workpiece 18 can be calculated on the basis of the diameter of the saw blade 14, on the basis of the swiveling angle of the saw arm 15 and on the basis of the position of the saw head 12. The swiveling angle of the saw arm 15 is measured by the swiveling angle sensor 37, while the position of the saw head 12 is measured by the position sensor 38. As soon as the arc length $\phi$ of the saw blade 14 matches the critical arc length $\phi_{crit}$, the swiveling movement of the saw arm 15 is interrupted. FIG. 2B shows the saw arm 15 with the saw blade 14 after the first swiveling movement of the saw arm 15. The saw arm 15 is slanted at a first swiveling angle $\alpha_1$.

Figure 2C:
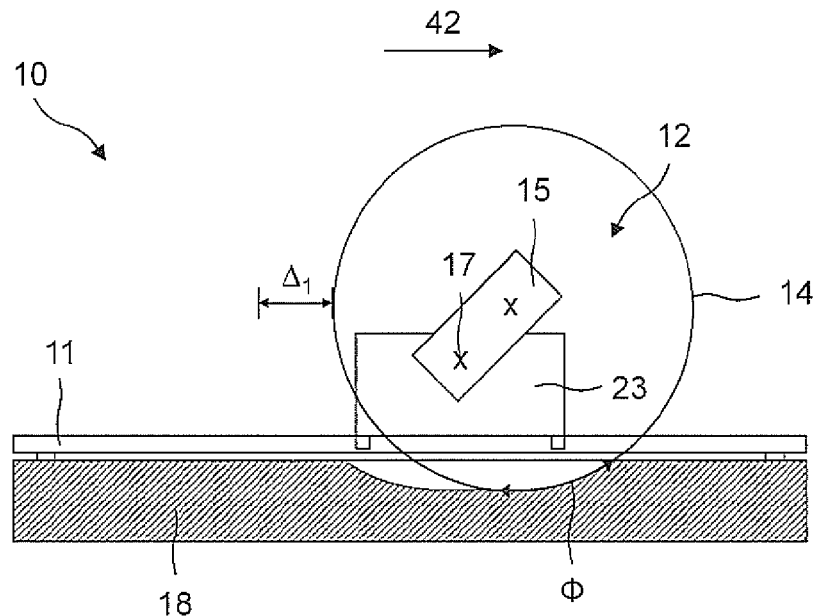

The saw head 12 with the slanted saw arm 15 is moved by the motor-driven advancing mechanism 13 in a forward direction 42 along the advancing direction 26. During the advancing movement, the arc length $\phi$ of the saw blade 14 that is engaged with the workpiece 18 decreases and falls below the critical arc length $\phi_{crit}$. During the advancing movement of the saw head 12 in the forward direction 42, the position of the saw head 12 is monitored by the position sensor 38. The position sensor 38 transmits the position of the saw head 12 to the first control unit 27, which then calculates a movement $\Delta$. As soon as the saw head 12 has been moved by a pre-set, first movement $\Delta_1$ in the forward direction 42, for instance, 1/10 to 3/20 of the diameter of the saw blade 14, the advancing movement of the saw head 12 in the forward direction 42 is interrupted. FIG. 2C shows the saw head 12 and the saw arm 15 with the saw blade 14 after the first advancing movement of the saw head 12. The saw arm 15 continues to be slanted at the first swiveling angle $\alpha_1$.

Figure 2D:
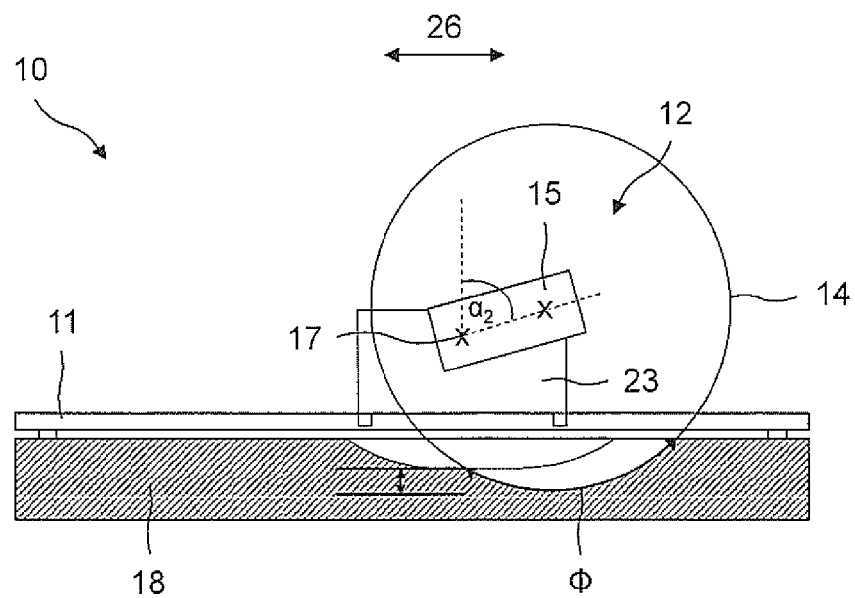

When the saw head 12 is stationary, the saw blade 14 is moved out of the first swiveling angle $\alpha_1$ around the swivel axis 17 and further into the workpiece 18 by a swiveling movement of the saw arm 15 (FIG. 2D). During the swiveling movement of the saw arm 15, the arc length $\phi$ of the saw blade 14 that is engaged with the workpiece 18 is calculated and compared to the critical arc length $\phi_{crit}$. As soon as the arc length $\phi$ of the saw blade 14 matches the critical arc length $\phi_{crit}$, the swiveling movement of the saw arm 15 is interrupted. FIG. 2D shows the saw head 12 and the saw arm 15 with the saw blade 14 after the second swiveling movement of the saw arm 15, which is slanted at a second swiveling angle $\alpha_2$.

Figure 2E:
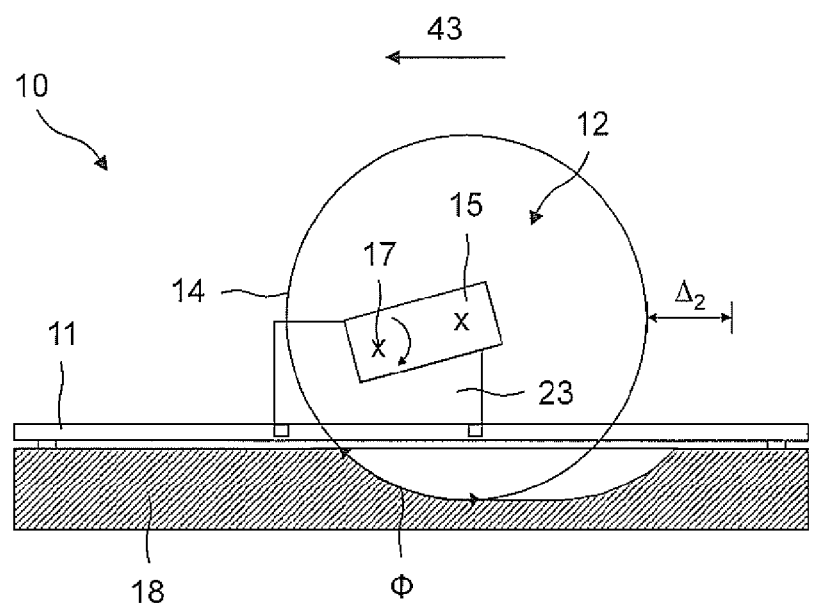

After the second swiveling movement of the saw arm 15, the saw blade 14 is moved by the motor-driven advancing mechanism 13 in a backward direction 43 opposite from the forward direction 42. During the advancing movement, the arc length $\phi$ of the saw blade 14 that is engaged with the workpiece 18 decreases and falls below the critical arc length $\phi_{crit}$ of the saw blade 14. During the advancing movement of the saw head 12 in the backward direction 43, the position of the saw head 12 is monitored by the position sensor 38. As soon as the saw head 12 has been moved by a pre-set, second movement $\Delta_2$ in the backward direction 43, for instance, 1/10 to 3/20 of the diameter of the saw blade 14, the advancing movement of the saw head 12 in the backward direction 43 is interrupted. FIG. 2E shows the saw head 12 and the saw arm 15 with the saw blade 14 after the second advancing movement of the saw head 12. The saw arm 15 continues to be slanted at the second swiveling angle $\alpha_2$.

The first movement $\Delta_1$ in the forward direction 42 and the second movement $\Delta_2$ in the backward direction 43 are pre-set values that have been stored in the first control unit 27. The values $\Delta_1$, $\Delta_2$ are selected in such a way that the saw blade 14 eases off the workpiece after the infeed motion and the arc length $\phi$ of the saw blade 14 that is engaged with the workpiece 18 falls below the critical arc length $\phi_{crit}$. As a rule, the values of the first and second movements $\Delta_1$, $\Delta_2$ match and differ only in terms of the movement directions 42, 43. This configuration causes the saw blade 14 to be once again situated in the starting position, after the second advancing movement in the advancing direction 26. The swiveling movement of the saw arm 15 around the swivel axis 17 and the advancing movement of the saw head 12 along the advancing direction 26 are carried out alternatingly until the plunging of the saw blade 14 is ended and the saw blade 14 has reached the desired cutting depth in the workpiece 18.

What is claimed is:

1. A method for controlling a device system having a saw blade attached to a saw arm, the saw blade movable along an advancing direction by a motor-driven advancer, the method comprising:
    calculating, via a controller during an infeed motion of the saw arm with the saw blade into the workpiece, an arc length of the saw blade engaged with the workpiece; and
    comparing the calculated arc length to a pre-set, critical arc length of the saw blade.

2. The method as recited in claim 1 wherein the infeed motion of the saw arm is interrupted and the saw blade undergoes an advancing movement in a forward direction along the advancing direction when the calculated arc length matches the critical arc length of the saw blade.

3. The method as recited in claim 2 wherein the controller calculates a movement of the saw blade in the forward direction during the advancing movement of the saw blade, and the calculated movement is compared to a pre-set, first movement.

4. The method as recited in claim 3 wherein the advancing movement of the saw blade is interrupted and further comprising providing an additional infeed motion of the saw arm into the workpiece when the calculated movement of the saw blade matches the first movement.

5. The method as recited in claim 4 wherein, during the further infeed motion of the saw arm, the controller calculates a further arc length of the saw blade engaged with the workpiece, and the further calculated arc length of the saw blade is compared to a further critical arc length.

6. The method as recited in claim 5 wherein the additional infeed motion of the saw arm is interrupted and further comprising providing a further advancing movement of the saw blade along the advancing direction in a backward direction opposite from the forward direction when the further calculated arc length matches the further critical arc length of the saw blade.

7. The method as recited in claim 6 wherein, during the further advancing movement of the saw blade, the control unit calculates a further movement of the saw blade in the backward direction, and the calculated further movement is compared to a pre-set, second movement.

8. The method as recited in claim 7 wherein the further advancing movement of the saw blade is interrupted when the further calculated movement of the saw blade matches the second movement.

* * * * *